United States Patent
Mitsui et al.

(10) Patent No.: US 8,713,758 B2
(45) Date of Patent: May 6, 2014

(54) OPENING/CLOSING DEVICE

(75) Inventors: Yasuhiro Mitsui, Ichihara (JP);
Hironobu Sayama, Ichihara (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 0 days.

(21) Appl. No.: 13/698,095

(22) PCT Filed: May 2, 2011

(86) PCT No.: PCT/JP2011/060528
§ 371 (c)(1),
(2), (4) Date: Nov. 15, 2012

(87) PCT Pub. No.: WO2011/145458
PCT Pub. Date: Nov. 24, 2011

(65) Prior Publication Data
US 2013/0061700 A1    Mar. 14, 2013

(30) Foreign Application Priority Data
May 17, 2010    (JP) .................................. 2010-113010

(51) Int. Cl.
*E05D 11/06* (2006.01)

(52) U.S. Cl.
USPC ................... 16/357; 361/679.27; 379/433.12; 455/575.4; 16/361

(58) Field of Classification Search
USPC ........... 16/357–359, 366, 368–370, 282, 294, 16/302, 361; 403/116; 379/433.12, 379/433.13; 455/575.3, 575.4; 361/679.06, 361/679.27
See application file for complete search history.

(56) References Cited

U.S. PATENT DOCUMENTS

| | | | | |
|---|---|---|---|---|
| 4,960,256 | A * | 10/1990 | Chihara et al. | 248/286.1 |
| 5,494,447 | A * | 2/1996 | Zaidan | 439/31 |
| 5,900,848 | A * | 5/1999 | Haneda et al. | 345/1.1 |
| 6,532,147 | B1 * | 3/2003 | Christ, Jr. | 361/679.27 |
| 6,714,403 | B2 * | 3/2004 | Furuki et al. | 361/679.09 |
| 7,065,835 | B2 * | 6/2006 | Kuramochi | 16/357 |
| 7,278,184 | B2 * | 10/2007 | Kuramochi | 16/357 |

(Continued)

FOREIGN PATENT DOCUMENTS

| | | |
|---|---|---|
| JP | 2008-271027 | 11/2008 |
| JP | 2009-059102 | 3/2009 |
| JP | 2009-071588 | 4/2009 |
| JP | 2009-218674 | 9/2009 |

OTHER PUBLICATIONS

International Search Report mailed on Aug. 9, 2011.

*Primary Examiner* — William Miller
(74) *Attorney, Agent, or Firm* — IPUSA, PLLC

(57) ABSTRACT

An opening/closing device includes a fixed plate, a moving plate movable relative to the fixed plate, a slide plate formed having a groove, a hinge including a first shaft connected to the fixed plate, a third shaft connected to the moving plate, and a second shaft between the first and third shafts, and moves the moving plate between closed and open positions relative to the fixed plate, a slide arm including a fourth shaft connected to the moving plate and a fifth shaft connected slidably along the groove, and moves the moving plate between the closed and open positions, a link arm having one end connected to the second shaft and the other to the fifth shaft. The fifth shaft slides inside the groove as the link arm moves along with the moving of the hinge when the moving plate is moved between the closed and open positions.

4 Claims, 18 Drawing Sheets

(56) References Cited

U.S. PATENT DOCUMENTS

| | | | |
|---|---|---|---|
| 7,580,726 B2 * | 8/2009 | Maatta et al. | 455/550.1 |
| 8,532,723 B2 * | 9/2013 | Ahn et al. | 455/575.4 |
| 8,582,293 B2 * | 11/2013 | Okamoto | 361/679.55 |
| 2009/0061963 A1 | 3/2009 | Miyaoka | |
| 2010/0188350 A1 * | 7/2010 | Sawada | 345/173 |
| 2011/0012858 A1 * | 1/2011 | Brookes et al. | 345/173 |
| 2013/0108196 A1 * | 5/2013 | Mitsui | 384/40 |
| 2013/0192140 A1 * | 8/2013 | Sayama | 49/386 |

\* cited by examiner

OPENING/CLOSING DEVICE

TECHNICAL FIELD

The present invention relates to an opening/closing device, particularly, an opening/closing device that moves a moving plate on a fixed plate.

BACKGROUND ART

A portable terminal apparatus such as a portable terminal device typically includes a first housing (fixed plate) having ten-keys or the like provided thereto, and a second housing (moving plate) having a liquid crystal display device provided thereto and being openable and closable relative to the first housing. As for typical structures for opening and closing the second housing relative to the first housing, there is a type which opens and closes by connecting the first and the second housings with a hinge mechanism and rotating the second housing relative to the first housing (collapsible type) and a type which opens and closes by sliding the second housing relative to the first housing (slidable type).

Meanwhile, in recent years, portable terminal devices are being provided with more functions, devices capable of receiving digital terrestrial broadcast are being provided, and the size of liquid crystal display devices are becoming larger. Along with the providing of more functions, the number of keys on a keyboard for performing an input process on the portable terminal device is increasing. Therefore, the size of the keyboard tends to become larger. Although improvement of portability of the portable terminal device is being demanded constantly, there is a limit in increasing the size of the liquid crystal display device or the keyboard.

In a state where the collapsible type portable terminal device is in a collapsed state, its liquid crystal display device becomes hidden. This leads to a problem where the liquid crystal display device cannot be used in the collapsed state. Although the problem of the collapsible type portable terminal device does not occur in the slidable type portable terminal device, generation of an overlapped portion between the first and the second housings is unavoidable when in an open state. This leads to a problem of being unable to utilize space efficiently.

Accordingly, there is proposed an opening/closing device having first and second housing that become flat (being on the same plane) when the first and the second housings are in an open state (see Patent Document 1-3). With this configuration, the liquid crystal display device can be used even when the first and the second housings are in a closed state. In addition, there is no overlapped part between the housings, and space can be efficiently utilized in a state where the first and the second housings are in an open state.

RELATED ART REFERENCE

Patent Document

Patent Document 1: Japanese Laid-Open Patent Publication No. 2009-218674
Patent Document 1: Japanese Laid-Open Patent Publication No. 2009-059102
Patent Document 2: Japanese Laid-Open Patent Publication No. 2009-071588

DISCLOSURE OF THE INVENTION

Problem to be Solved by Invention

However, the opening/closing device disclosed in Patent Document 1 is configured to move the second housing relative to the first housing by a single arm member. This had lead to a problem of the movement being unstable due to the second housing arbitrarily rotating during the movement.

The opening/closing device disclosed in Patent Documents 2 and 3 require two operations, one being a sliding operation for sliding the second housing relative to the first housing upon an opening/closing operation and another being a raising/lowering operation for raising/lowering the second housing relative to the first housing. This had lead to a problem of the opening/closing operation being troublesome.

Means for Solving Problem

It is a general object of the present invention to provide an improved useful opening/closing device that solves the above-described problems of the related art.

It is a specific object of the present invention to provide an opening/closing device that enables a moving plate to move steadily and smoothly relative to a fixed plate by a single operation.

In order to achieve such object, an embodiment of the present invention provides an opening/closing device including a fixed plate, a moving plate that can be moved relative to the fixed plate, a slide plate that is formed having a slide groove, a hinge arm including a first shaft part rotatably connected to the fixed plate, a third shaft part rotatably connected to the moving plate, and a second shaft part provided between the first shaft part and the third shaft part, and configured to move the moving plate between a closed position and an open position relative to the fixed plate by centrally rotating about the first shaft part, a slide arm including a fourth shaft part rotatably connected to the moving plate and a fifth shaft part connected slidably along the slide groove of the slide plate, and configured to move the moving plate between the closed position and the open position relative to the fixed plate by rotating about the fourth shaft part, a link arm having one end part connected to the second shaft part and another end part connected to the fifth shaft part, wherein the fifth shaft part is configured to slide inside the slide groove as the link arm moves along with the moving of the hinge arm when the moving plate is moved between the closed position and the open position.

Figure 1A:
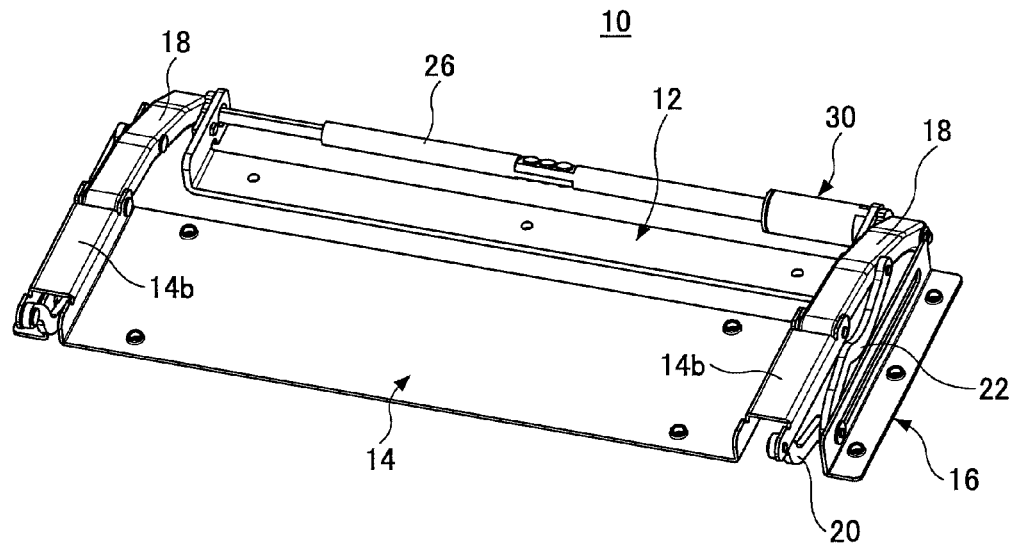
FIG. 1A is a perspective view illustrating a closed state of a moving plate of an opening/closing mechanism according to an embodiment of the present invention.

EXPLANATION OF REFERENCE NUMERALS 1 electronic device
2 first housing
3 second housing
4 liquid crystal display device
5 keyboard
10 opening/closing mechanism
12 fixed plate
12a base part
12b upright part
12c shaft hole
12d mounting hole
13 stopper pin
14 moving plate
14a base part
14b arm installing part
14c, 14d shaft hole
16 slide plate
16a base part
16b upright part
16c slide groove
18 hinge arm
18a, 18b, 18c shaft hole
20 slide arm
20a, 20b shaft hole
22 link arm
22a shaft hole
23 slide guide
24 stopper plate
26 base shaft
29 fixing pin
30 hinge unit
31 head cam
32 slide cam
33 hinge spring
34 hinge case
35 hinge plate
37 stopper plate
37a first contact surface
37b second contact surface

EMBODIMENTS OF THE INVENTION

In the following, embodiments of the present invention are described with reference to the accompanying drawings.

Figure 1B:
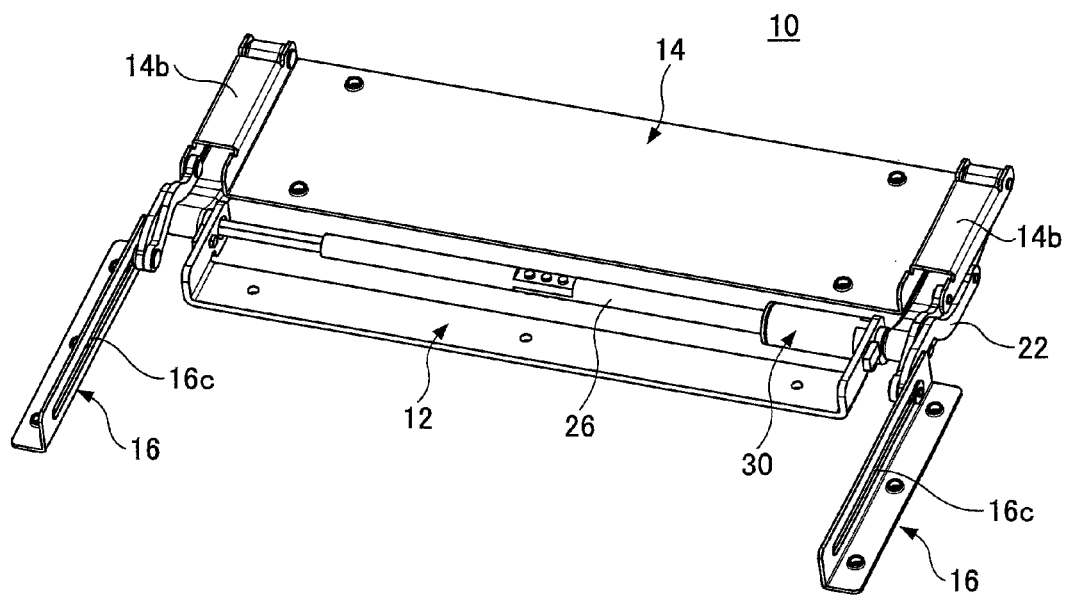
FIG. 1B is a perspective view illustrating an open state of a moving plate of an opening/closing mechanism according to an embodiment of the present invention.
Figure 2:
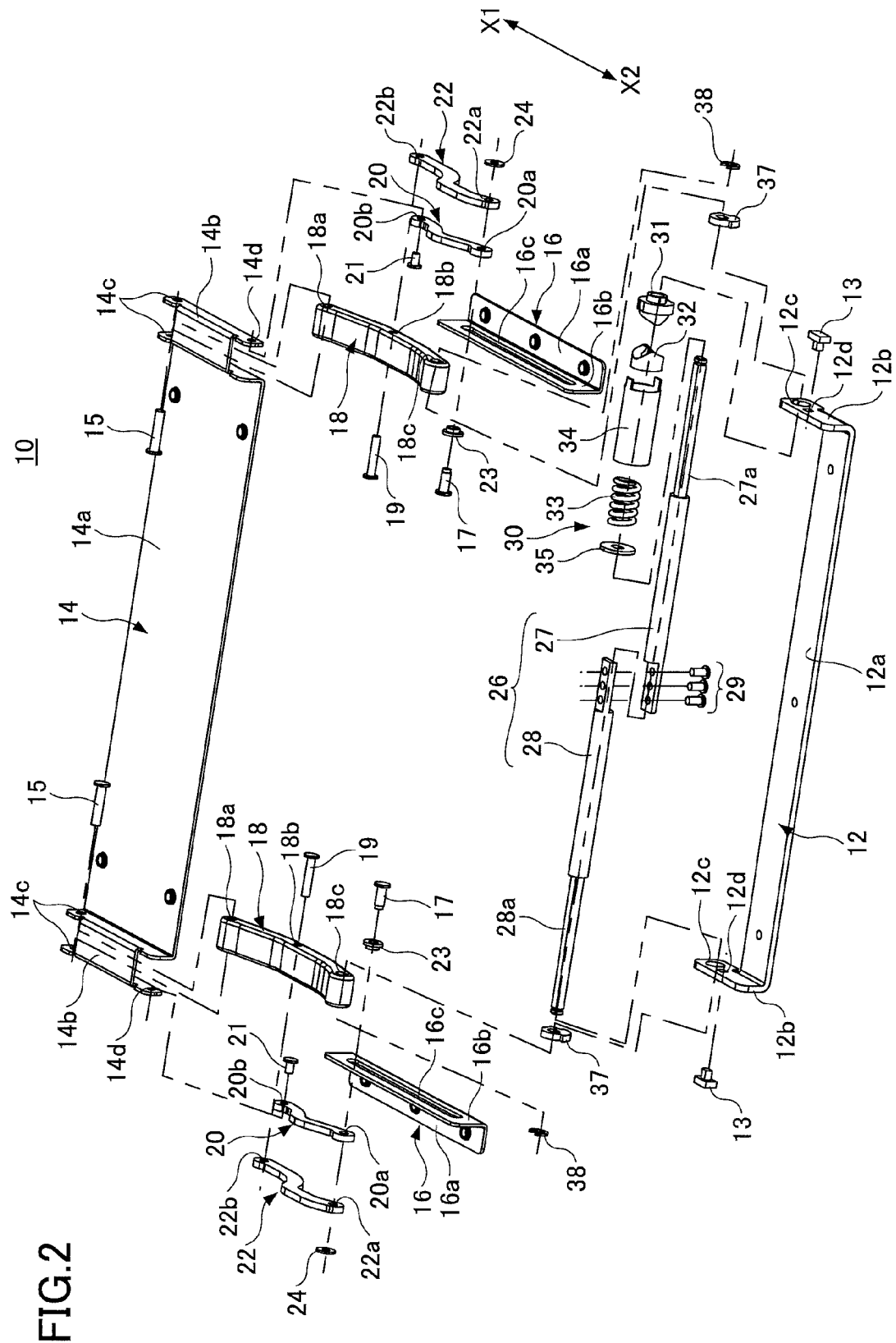
FIG. 2 is a exploded perspective view of an opening/closing mechanism according to an embodiment of the present invention.
Figure 3A:
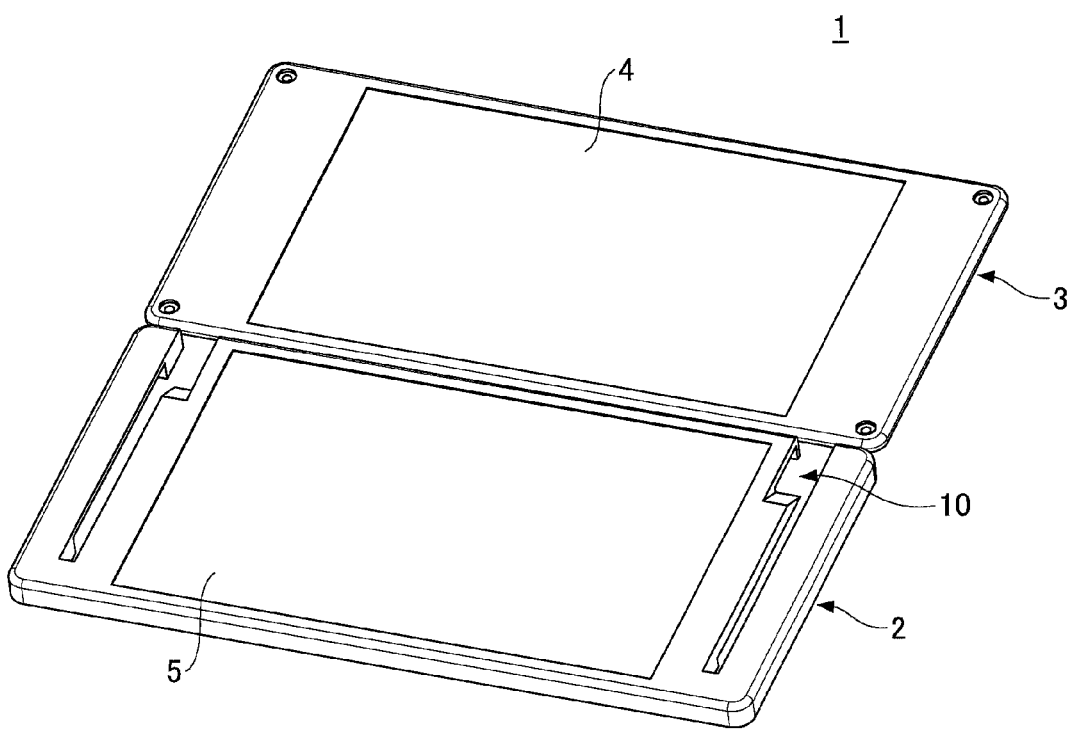
FIG. 3A is a perspective view of an electronic device in a state having an opening/closing mechanism mounted thereon according to an embodiment of the present invention.
Figure 3B:
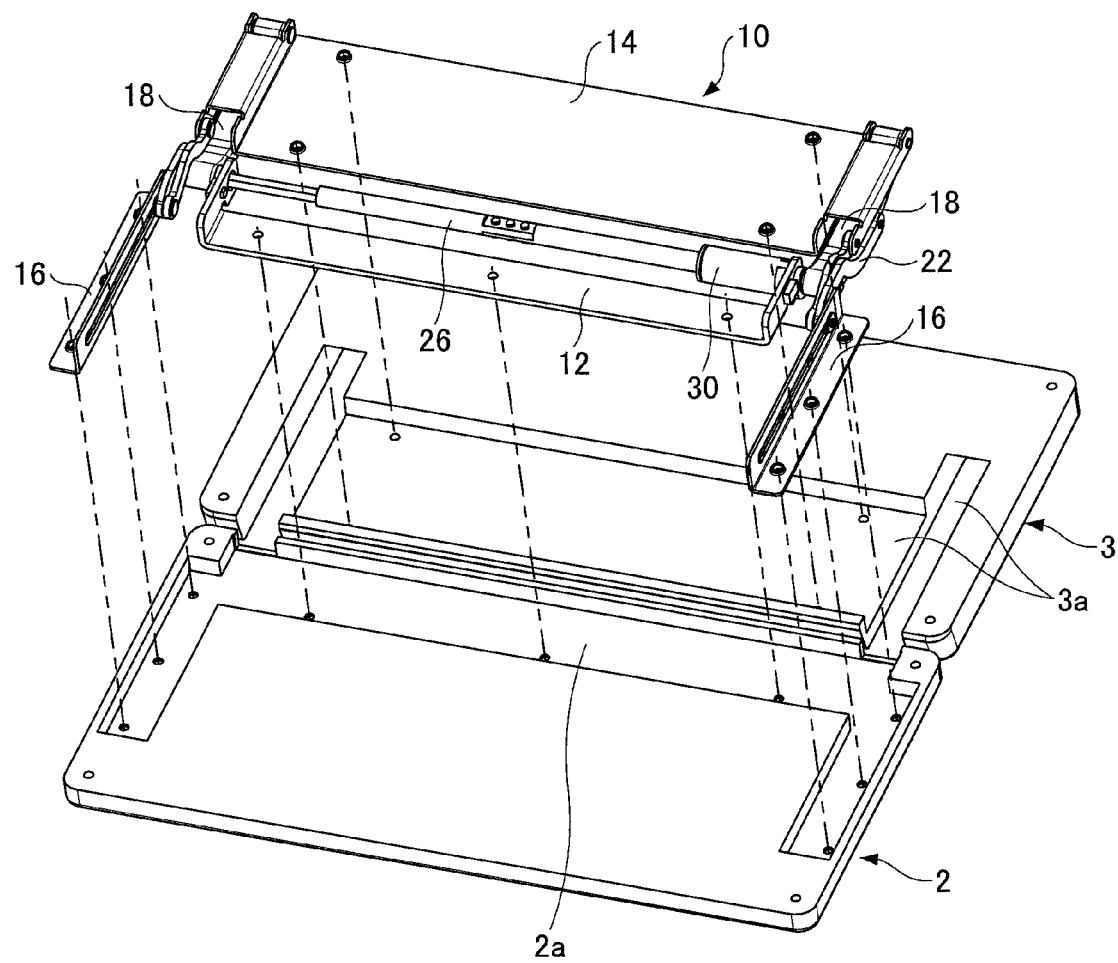
FIG. 3B is an exploded perspective view for describing attachment of an opening/closing mechanism with respect to an electronic device according to an embodiment of the present invention.
Figure 4A:
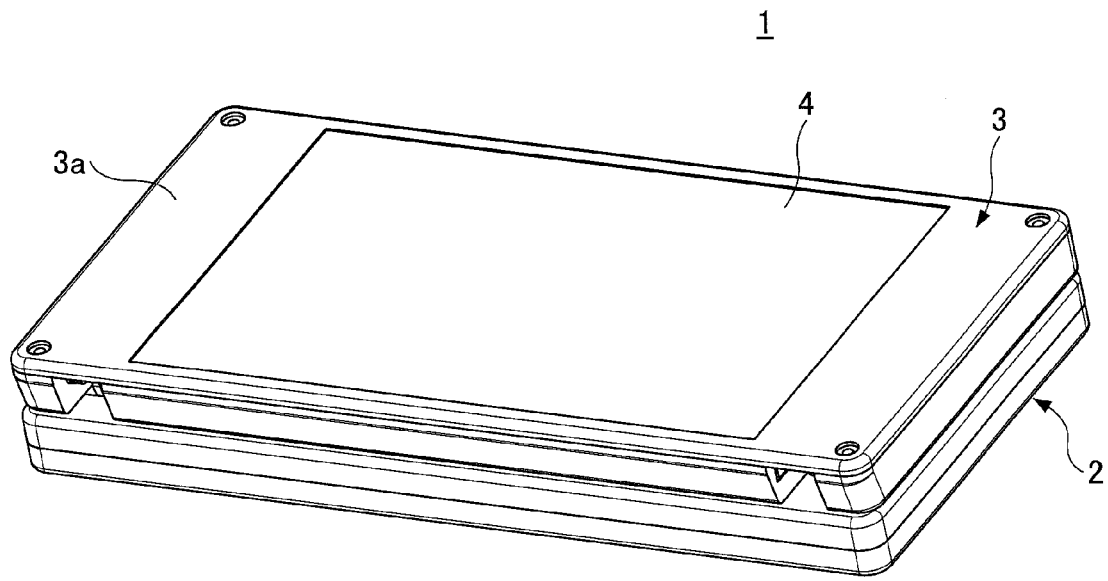
FIG. 4A is a perspective view illustrating a closed state of an electronic device having an opening/closing mechanism mounted thereto according to an embodiment of the present invention.
Figure 4B:
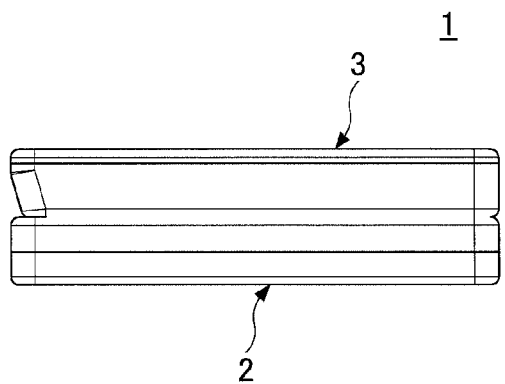
FIG. 4B is a side view illustrating a closed state of an electronic device.
Figure 5A:
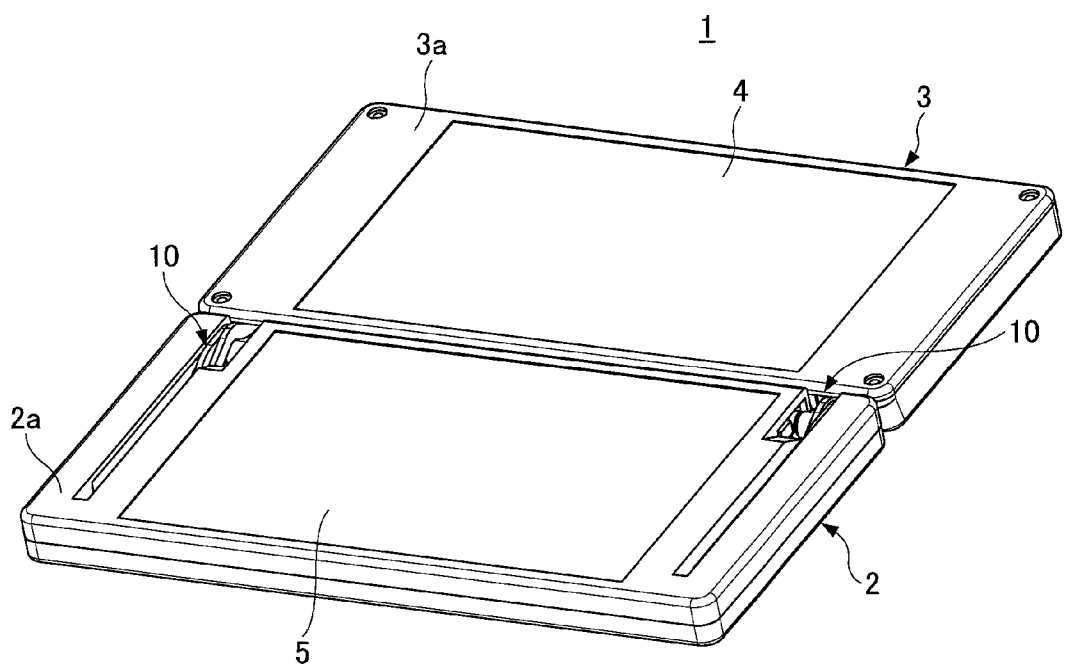
FIG. 5A is a perspective view illustrating an open state of an electronic device having an opening/closing mechanism mounted thereto according to an embodiment of the present invention.
Figure 5B:
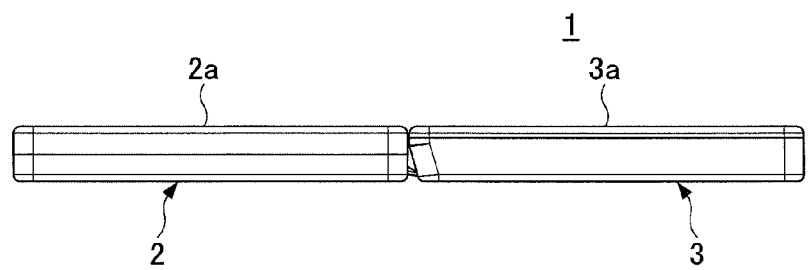
FIG. 5B is a side view illustrating an open state of an electronic device.

FIGS. 1 and 2 are diagrams for describing an opening/closing device 10 (also referred to as "opening/closing mechanism 10") according to an embodiment of the present invention. FIGS. 3 to 5 are diagrams for describing an electronic device 1 having the opening/closing mechanism 10 provided therein.

The electronic device 1 is a portable terminal device which includes, for example, a first housing 2, a second housing 3, and an opening/closing mechanism 10. A keyboard 5 or the like is provided on an upper surface 2a (also referred to as "mounting recess part 2a") of the first housing 2.

Although a liquid crystal display device or the like may be provided on the mounting recess part 2a of the first housing 2, this embodiment describes an example where a keyboard is provided. An upper surface 3a of the second housing 3 has, for example, a liquid crystal display device 4 provided thereon.

Because there is a demand to improve portability of a portable terminal device by reducing its size when being carried, the electronic device 1 according to this embodiment has a configuration in which the second housing 3 can move between a closed position and an open position relative to the first housing 2 by providing the opening/closing device 10.

FIG. 4 illustrates a state where the second housing 3 is in a closed position (hereinafter referred to as "closed state").

FIG. 5 illustrates a state where the second housing is in an open position (hereinafter referred to as "open state"). In the closed state, the second housing 3 is in a state superposed on an upper part of the first housing 2. Therefore, only the liquid crystal display device 4 is exposed on the surface 3a. Therefore, the liquid crystal display device 4 can be viewed from the outside even in the closed state.

In this embodiment, the first housing 2 and the second housing 3 have the same shape from a plan view. Therefore, the area of the electronic device 1 in the closed state is half the area of the electronic device 1 in the open state from a plan view. Accordingly, the electronic device 1 attains a compact size in the closed state. Thus, portability can be obtained.

On the other hand, in the open state (as described in detail below), the first housing 2 and the second housing 3 maintain a position where the upper surface 2a and the upper surface 3a are on the same plane by moving the second housing 3 from a closed position to an open position by rotating a hinge arm 18, a slide arm 20, and a link arm 22 included in the opening/closing mechanism 10. In this open state, the first housing 2 and the second housing 3 do not overlap with each other and are arranged on the same plane as illustrated in FIG. 5.

In this open state, the entire upper surfaces 2a, 3a of the first and the second housings 2, 3 are in an exposed state facing upward. Accordingly, the entire upper surface 2a of the first housing 2 can be used as an area on which a component of the electronic device 1 is mounted. Likewise, the entire upper surface 3a of the second housing 3 can be used as an area on which a component of the electronic device 1 is mounted.

With the electronic device 1 including the opening/closing device 10 according to this embodiment, the entire upper surface of the first housing 2 and the entire upper surface of the second housing 3 can be used as areas on which components are mounted. Therefore, the efficiency of utilizing the space in each of the housings 2, 3 can be increased.

Next, the opening/closing mechanism 10, which makes the above-described movement of the first and the second housings 2, 3 possible, is explained in further detail.

Figure 6A:
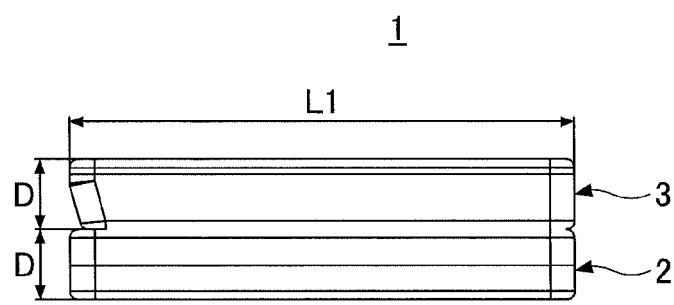
FIG. 6A is a side view of an electronic device for describing movement of an opening/closing mechanism according to an embodiment of the present invention.
Figure 6B:
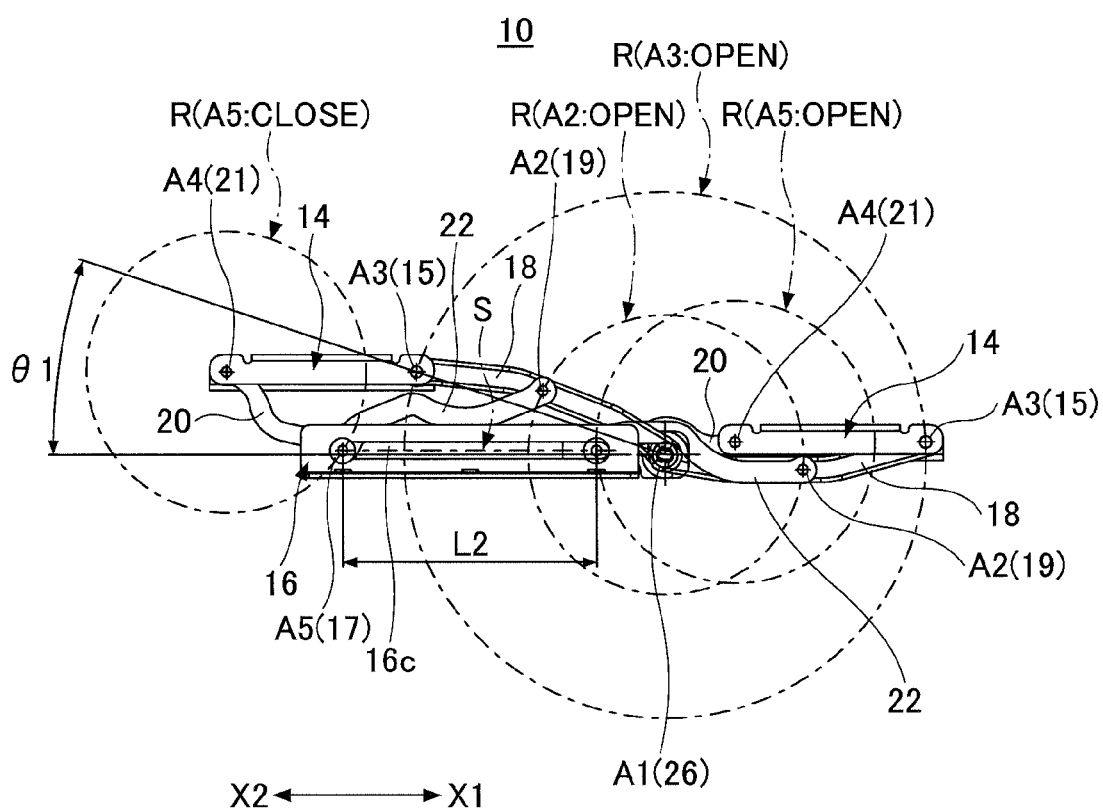
FIG. 6B is a side view of an opening/closing mechanism for describing movement of the opening/closing mechanism according to an embodiment of the present invention.

As illustrated in FIG. 1, FIG. 2, and FIG. 6B, the opening/closing mechanism 10 includes, for example, a fixed plate 12, a moving plate 14, a slide plate 16, the hinge arm 18, the slide arm 20, the link arm 22, and a hinge unit 30.

The fixed plate 12 is fixed to the first housing 2 of the electronic device 1. More specifically, the fixed plate 12 is fixed to the mounting recess part 2a formed in the first housing 2 as illustrated in FIG. 3B. Therefore, the first housing 2 is configured to move integrally with the fixed plate 12.

The fixed plate 12, which is formed by pressing a metal plate member, includes a configuration in which a base part 12a (being fixed to the first housing 2) and upright parts 12b (being formed by bending both end parts of the base part 12a) are integrally formed. The upright parts 12b are bent substantially in a right angle relative to the base part 12a. The upright part 12b includes a shaft hole 12c which axially supports the below-described base shaft 26 and a mounting hole 12d to which a stopper pin 13 is attached.

The moving plate 14 is configured to move relative to the fixed plate 12. The moving plate 14 is fixed to the second housing 3 of the electronic device 1. More specifically, the moving plate 14 is fixed to the mounting recess part 3a formed in the second housing 3 as illustrated in FIG. 3B. Therefore, the second housing 3 is configured to move integrally with the moving plate 14.

The moving plate 14, which is formed by pressing a metal plate member (alternatively, a metal mold material), includes a base part 14a (being fixed to the second housing 3) and arm installing parts 14b (being formed on both ends of the base part 14a) as illustrated in FIG. 2. The arm installing part 14b is integrally formed with both ends of the base part 14a and is integrally formed to have a cross-section of the letter C. The below-described hinge arm 18 is installed inside the arm installing part 14b in correspondence with the rotation of the hinge arm 18.

Further, shaft holes 14c, 14d are formed in the arm installing part 14c. An upper end part of the hinge arm 18 is rotatably connected to a shaft hole 14c. More specifically, shaft pins 15 are matched to the positions of the shaft hole 18a of the hinge arm 18 and the shaft hole 14c of the arm installing part 14b, and inserted to the shaft holes 14c, 18a, respectively. Thereby, the hinge arm 18 is rotatably connected to the arm installing part 14b.

Further, an upper end part of the slide arm 20 is rotatably connected to the shaft hole 14d. More specifically, shaft pins 21 are matched to the positions of the shaft hole 20b of the slide arm 20 and the shaft hole 14d of the arm installing part 14b, and inserted to the shaft holes 14d, 20b, respectively. Thereby, the slide arm 20 is rotatably connected to the arm installing part 14b.

The slide plate 16, which is a resin molded component or a metal press-molded component, is fixed to the mounting recess part 2a of the first housing 2 in a similar manner as the fixed plate 12. The slide plate 16, which is provided extending in the moving direction of the moving plate 14 (directions X1, X2 in the drawing), includes a base part 16a, an upright part 16b, and a slide groove 16c. The base part 16a is a part to be fixed to the mounting recess part 2a. The upright part 16b is bent in a right angle relative to the base part 16a. The slide groove 16c is an elongated hole being formed in the upright part 16b and extending in the moving direction of the moving plate 14.

A lower end part of the slide arm 20 and a lower end part of the link arm 22 are connected to the slide groove 16c. More specifically, shaft pins 17 are matched to the positions of the shaft hole 20a formed in the lower end part of the slide arm 20 and the shaft hole 22a formed in the lower end part of the link arm 22, and are inserted to each of the shaft holes 20a, 22a, and the slide groove 16c by way of slide guides 23. Then, end parts of the shaft pins 17 projecting from the slide groove 16c are engaged to stopper plates 24.

Thereby, the slide arm 20 and the link arm 22 are rotatable around the shaft pins 17 serving as the center. Further, the shaft pins 17 are movable along the slide grooves 16c in the moving direction (X1, X2 directions) of the moving plate 14 because the slide guides 23 are slidably engaged to the slide grooves 16c. Therefore, each of the lower end parts of the slide arm 20 and the link arm 22 is movable along the slide groove 16c in the moving direction (X1, X2 directions) of the moving plate 14.

The hinge arm 18 includes the shaft hole 18a formed at its upper end part, a shaft hole 18c formed at its lower end part, and a shaft hole 18b formed in a position between the shaft hole 18a and the shaft hole 18c. The shaft hole 18a formed at the upper end part and the moving plate 14 (arm installing part 14b) are rotatably connected by way of the shaft pins 15 in the manner described above.

The shaft hole 18c formed at the lower end part of the hinge arm 18 is borne by the base shaft 26 included in the hinge unit. The base shaft 26 is borne by the shaft hole 12c formed in the fixed plate 12. Further, the base shaft 26, which is formed of a pair of shaft half members 27, 28, is mounted to the shaft hole 18c by inserting its shaft half member 27 therethrough.

Non-circular parts 27a, 28a are formed in predetermined areas of the end parts of the shaft half members 27, 28, respectively. The shaft hole 18c has a shape corresponding to the non-circular part 27a. Thus, by mounting the base shaft 26 (shaft half member 27) to the shaft hole 18c, the hinge arm 18 is borne by the fixed plate 12 (shaft hole 12c) while being rotatably integrated with the base shaft 26. It is to be noted that the part at which the base shaft 26 and the hinge arm 18 are connected is referred to as "first shaft part A1" in the following description.

The upper end part of the link arm 22 is rotatably connected to the shaft hole 18b formed between the shaft hole 18a and the shaft hole 18c of the hinge arm 18. More specifically, shaft pins 19 are matched to the positions of the shaft hole 18b formed in the hinge arm 18 and a shaft hole 22b formed in the upper end part of the link arm 22, and inserted to the shaft hole 18b, 22b, respectively. Thereby, the link arm 22 is rotatably connected to the hinge arm 18. It is to be noted that the part at which the link arm 22 is rotatably connected to the hinge arm 18 is referred to as "second shaft part A2" in the following description.

The shaft holes 18a formed at the upper end part of the hinge arm 18 are rotatably connected to the shaft holes 14c of the moving plate 14 (arm installing part 14b) by way of the shaft pins 15 as described above. It is to be noted that the part at which the hinge arm 18 is rotatably connected to the moving plate 14 is referred to as "third shaft part A3" in the following description.

As illustrated in FIG. 6B, the hinge arm 18 having the above-described configuration exhibits a function of causing the moving plate 14 to move between the closed position and the open position relative to the fixed plate 12 by centrally rotating about the first shaft part A1 connected to the fixed plate 12. During the moving of the moving plate 14 between the closed position and the open position, the hinge arm 18 and the link arm 22 relatively rotate at the second shaft part A2, and the moving plate 14 and the hinge arm 18 relatively rotate at the third shaft part A3. The circle being illustrated with a broken line and indicated by arrow R (A3: Open) in FIG. 6B represents a trajectory of the third shaft part A3 centrally rotating about the first shaft part A1 in the open position.

The slide arm 20 has the shaft hole 20a of its lower end part, together with the shaft hole 22a of the lower end part of the link arm 22, rotatably and slidably (in the X1, X2 directions) connected to the slide groove 16c of the slide plate 16 by way of the shaft pin 17.

Further, the shaft hole 20b formed in the upper end part of the slide arm 20 is rotatably connected to the shaft hole 14d formed in the moving plate 14 (arm installing part 14b) by way of the shaft pin 21. It is to be noted that the part at which the slide arm 20 is rotatably connected to the moving plate 14 is referred to as "fourth shaft part A4", and the part at which the slide arm 20 is slidably connected to the slide plate 16 along the slide groove 16c is referred to as "fifth shaft part A5" in the following description.

The length of the slide arm 20 (slant distance between the fourth shaft part A4 and the fifth shaft part A5) is set to be shorter than the length of the hinge arm 18 (slant distance between the first shaft part A1 and the third shaft part A3).

As illustrated in FIG. 6A, the slide arm 20 having the above-described configuration exhibits a function of causing the moving plate 14 to move between the closed position and the open position relative to the fixed plate 12 by centrally rotating about the fourth shaft part A4 connected to the moving plate 14. During this, the fifth shaft part A5 moves along the slide groove 16c (in directions of arrows X1, X2 in the drawing) as described below.

It is to be noted that the circle being illustrated with a broken line and indicated by arrow R (A5: Close) in FIG. 6A represents a trajectory of the fifth shaft part A5 centrally rotating about the fourth shaft part A4 in the closed position, and the circle being illustrated with a broken line and indicated by arrow R (A5: Open) in FIG. 6A represents a trajectory of the fifth shaft part A5 centrally rotating about the fourth shaft part A4 in the open position.

The link arm 22 has the shaft hole 22a of formed in its lower end part rotatably connected to the slide groove 16c of the slide plate 16 by way of the shaft pin 17 and the shaft hole 22b formed in its upper end part rotatably connected to the shaft hole 18b of the hinge arm 18 by way of the shaft pin 19. That is, the link arm 22 has its upper end part rotatably connected to the second shaft part A2 and its lower end part rotatably connected to the fifth shaft part A5.

Accordingly, the lower end part of the link arm 22 is configured to slide along the slide groove 16c by being connected to the fifth shaft part A5. In this state, the shaft pin 17 is borne by the shaft hole 22a of the link arm 22 and the shaft hole 20a of the slide arm 20. Thus, by sliding the fifth shaft part A5 along the slide groove 16c in the X1, X2 directions, the rotation centers of the slide arm 20 and the link arm 22 toward the lower end part also move along the slide groove 16c in the X1, X2 directions. It is to be noted that the circle being illustrated with a broken line and indicated by arrow R (A2: Open) in FIG. 6A represents a trajectory of the second shaft part A2 centrally rotating about the first shaft part A1 in the open position.

Here, a method of setting the length of each of the arms 18, 20, 22, and the slide groove 16c included in the opening/closing mechanism 10 is described mainly with reference to FIG. 6.

It is assumed that the width and the thickness of the first and the second housings 2, 3 are "L1" and "D", respectively. In a case of setting the length of each of the arms 18, 20, 22, first, the length of the hinge arm (slant distance between the first shaft part A1, and the third shaft part A3) is set. When setting the length of the hinge arm 18, the angle relative to a line connecting the slide groove 16c, the first shaft part A1, and the third shaft part A3 (illustrated with arrow θ1 in the drawing) becomes important.

If the angle θ1 is small, movement urging force pushes the hinge arm 18 toward the first shaft part A1 in a case where the second housing 3 (moving plate 14) is moved toward the open position. Thus, the force exerted toward the rotating direction becomes small. Accordingly, if the angle θ1 is set to a small angle, the second housing 3 (moving plate 14) would be unable to smoothly open from the closed position to the open position. Thus, the position of the hinge arm 18 in the closed state is required to be set so that the angle θ1 is as large as possible with consideration of the thickness of each of the housings 2, 3.

Subsequent to setting the angle θ1 and the length of the hinge arm 18 based on the above, the length of the slide arm 20 (slant distance between the fourth shaft part A4 and the fifth shaft part A5) is set.

Similar to the above, the length of the link arm 22 is set to be shorter than the length of the hinge arm 18.

By setting the length of the link arm 22 shorter than the length of the hinge arm 18, the second housing 3 becomes tilted (inclined) relative to the first housing 2 when moving the second housing 3 (moving plate 14) from the closed position to the open position as described below with reference to FIGS. 9 and 10. More specifically, the angle between the first housing 2 and the second housing 3 (indicated by arrow θ2 in FIG. 9A, hereinafter referred to as "tilt angle") is set to form an acute angle (θ2<90 degrees). The tilt angle θ2 can be adjusted by the length of the slide arm 20.

When the length of the slide arm 20 is defined, the length L2 of the slide groove 16c becomes defined. The length L2 represents the distance between the position of the fifth shaft part A5 when the moving plate 14 is in the closed position and the position of the fifth shaft part A5 when the moving plate 14 is in the open position.

The position of the fifth shaft part A5 when the moving plate 14 is in the closed position corresponds to the intersection point between the trajectory of the slide arm 20 centrally rotating about the fourth shaft part A4 in the closed position (circle illustrated with a broken line and indicated by arrow R (A5: Closed) in the drawing) and the center line of the slide groove 16c extending in the X1, X2 directions (dash-dot line indicated by arrow S in the drawing). Further, the position of the fifth shaft part A5 when the moving plate 14 is in the open position corresponds to the intersection point between the trajectory of the slide arm 20 centrally rotating about the fourth shaft part A4 in the open position (circle illustrated with a broken line and indicated by arrow R (A5: Open) in the drawing) and the center line of the slide groove 16c extending in the X1, X2 directions (dash-dot line indicated by arrow S in the drawing).

When the length L2 of the slide groove 16c is defined as described above, finally, the length of the link arm 22 (slant distance between the second shaft part A2 and the fifth shaft part A5) is set. The link arm 22 has its upper end part connected to the hinge arm 18 at the second shaft part A2. Accordingly, the movement trajectory of the second shaft part A2 connecting the link arm 22 and the hinge arm 18 has the first shaft part A1 (rotation fulcrum of the hinge arm 18) serving as its center and moves along a circle (circle illustrated with a broken line and indicated by arrow R (A2: Open) in which the distance between the first shaft part A1 and the second shaft part A2 is its radius. Further, the lower end of the link arm 22 is connected to the slide arm 20 at the fifth shaft part A5, to thereby move within the slide groove 16c in the X1, X2 directions. Accordingly, based on these two conditions, the length of the link arm 22 is set.

Next, the hinge unit 30 is described. The hinge unit 30 includes, for example, the base shaft 26, a head cam 31, a slide cam 32, a hinge spring 33, and a hinge case 34 as illustrated in FIGS. 1, 2, and 7.

As described above, the base shaft 26 includes the shaft half member 27 and the shaft half member 28 which form the base shaft 26 by being bonded together with a fixing pin(s) 29. The non-circular parts 27a, 27b are formed in a predetermined area at an outer side of the shaft half members 27, 28, respectively. Each of the cams 31, 32, the hinge spring 33, and the hinge case 34 are mounted to the non-circular part 27a.

The base shaft 26 is inserted from an inner side to the shaft hole 12c formed in the fixed plate 12. Thereby, the base shaft 26 is rotatably borne by the shaft hole 12c of the upright part 12b. In the state where the base shaft 26 is borne by the fixed plate 12, the base shaft 26 has both of its end parts extending a predetermined length from the upright parts 12b toward its outer side. A stopper plate 37 and the hinge arm 18 (shaft hole 18c) are sequentially inserted through the extending parts. Further, an E washer 38 is mounted to each end of the base shaft 26 after having the components 37, 18 inserted. Thereby, each of the components 37, 18 can be prevented from being detached.

The head cam 31 is fixed to the fixing plate 12. Further, the slide cam 32 is integrally rotates with the base shaft 26 (shaft half body 27) and has a configuration of being able to slide along the shaft half body 27 in the shaft direction. Each cam 31, 32 has an inner surface called a cam surface. The cam surfaces are formed facing each other.

The hinge spring 33 has one end contacting the hinge plate 35 and another end contacting the slide cam 32. Further, the hinge plate 35 includes a hole having a shape corresponding to the shape of the non-circular part 27a, so as to be engaged by contacting with a step part formed in an inner end part of the non-circular part 27a. Accordingly, a resilient force of the hinge spring 33 causes the slide cam 32 to exert a pressing force to the head cam 31.

The head cam 31, the slide cam 32, and the hinge spring 33 are installed inside the hinge case 34. The hinge case 34, which is formed of a cylindrical metal material, is fixed to the upright part 12b.

In the hinge unit 30 having the above-described configuration, a convex surface and a concave surface engageable with each other are formed at contacting surfaces between the head cam 31 and the slide cam 32. At a position where a peak part of the convex surface of each cam 31, 32 contact each other (referred to as "center position"), running torque does not occur. However, in a case where the convex part is deviated from the center position, running torque is generated by the elastic force of the hinge spring 33 between each of the cams 31, 32.

As described above, the hinge arm 18 moves between the closed position and the open position. In this embodiment, an intermediate position between the closed position and the open position is set, so that the cams 31, 32 are in a neutral position, respectively. Therefore, the hinge arm 18 is urged to rotate toward the closed position by the hinge unit 30 in a state where the hinge arm 18 is positioned between the closed position and the intermediate position whereas the hinge arm 18 is urged to rotate toward the open position by the hinge unit 30 in a state where the hinge arm 18 is positioned between the open position and the intermediate position. Hence, the hinge unit 30 having the above-described configuration is configured as a so-called cam type semiautomatic hinge.

Therefore, in a case of opening the moving plate 14 (second housing 3) relative to the fixed plate 12 (first housing 2), once the moving plate 14 is operated to open from the closed position to the neutral position, the moving plate 14 can be automatically moved toward the open position thereafter. On the other hand, in a case of closing the moving plate 14 relative to the fixed plate 12, once the moving plate 14 is operated to close from the open position to the neutral position, the moving plate 14 can be automatically moved toward the closed position thereafter. Accordingly, operability of the opening/closing device 10 (electronic device 1) can be improved by providing a semiautomatic hinge type hinge unit 30.

Figure 7A:
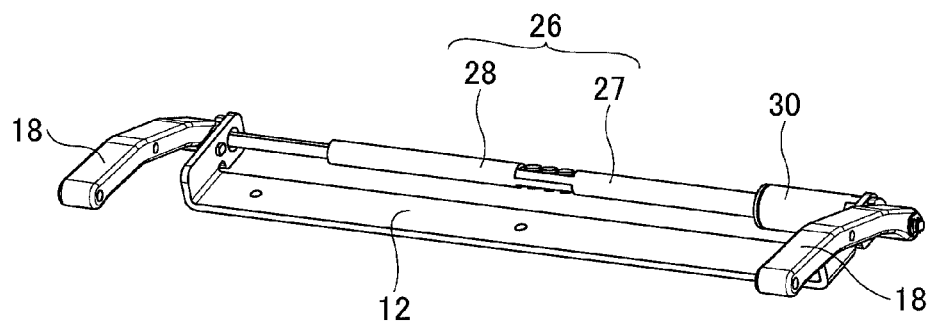
FIG. 7A is a perspective view for describing a hinge unit to be assembled to an opening/closing mechanism according to an embodiment of the present invention.
Figure 7B:
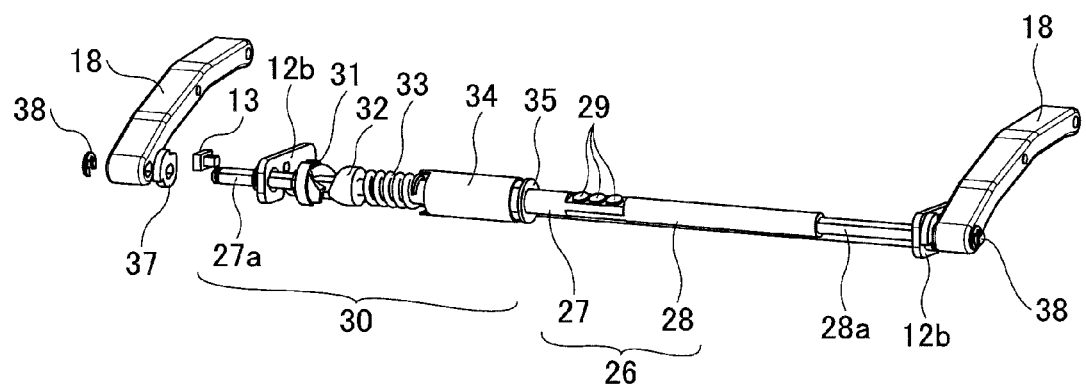
FIG. 7B is an exploded perspective view for describing a hinge unit to be assembled to an opening/closing mechanism according to an embodiment of the present invention.
Figure 7C:
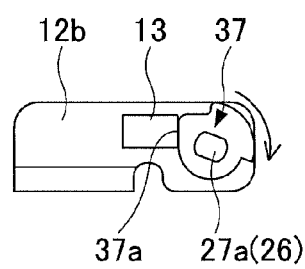
FIG. 7C is a diagram for describing a hinge unit to be assembled to an opening/closing mechanism and for describing a stopper pin according to an embodiment of the present invention.
Figure 7D:
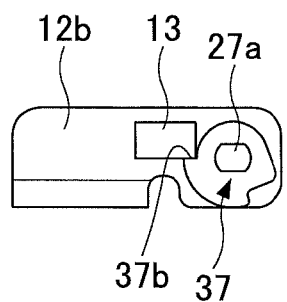
FIG. 7D is a diagram for describing a hinge unit to be assembled to an opening/closing mechanism and for describing a stopper pin according to an embodiment of the present invention.

FIGS. 7C and 7D are diagrams for describing movement of the stopper pin 13 and the stopper plate 37. The stopper pin 13 is fixed to the upright part 12b, and the shaft half body 27 is mounted to the non-circular part 27a of the base shaft 26. Therefore, although the stopper pin 13 is fixed and not displaced, the stopper plate 37 rotates integrally with the base shaft 26.

The stopper pin 13, which is made of a metal component, has a rectangular shape. Further, the stopper plate 37 includes a first contact surface 37a at its outer peripheral part extending toward a tangential line and a second contact surface 37b having a step part.

FIG. 7C illustrates a state where the second housing 3 and the moving plate 14 are in a closed position. In this closed state, the first contact surface 37a of the stopper plate 37 is in a state pressed against an outer peripheral surface of the stopper pin 13. Accordingly, the stopper plate 37 constrains the rotation of the base shaft 26 by having the stopper pin 13 pressed against the first contact surface 37a. Accordingly, the second housing 3 and the moving plate 14 can be prevented from becoming unstable in the closed state.

On the other hand, when the second housing 3 and the moving plate 14 is moved from the closed position to the open position, the stopper plate 37, rotates together with the movement in a direction (clockwise direction) indicated by the arrow illustrated in FIG. 7C. FIG. 7D illustrates a state where the second housing 3 and the moving plate 14 have moved to the open position. In this open state, the step part of the second contact surface 37b of the stopper plate 37 engages a corner part of the stopper pin 13. Thereby, the stopper plate 37 (base shaft 26) is prevented from rotating beyond such position. Correspondingly, the second housing 3 and the moving plate 14 are prevented from rotating further beyond the open position.

Next, a detailed operation of the electronic device 1 and the opening/closing device 10 having the above-described configuration is described with reference to FIGS. 8 to 13. FIGS. 8 to 13 illustrate the movements of the second housing 3 and the moving plate 14 shifting from a closed state to an open state. In each of the drawings, "A" illustrates movement of the electronic device 1, and "B" illustrates movement of the opening/closing mechanism 10.

Figure 8A:
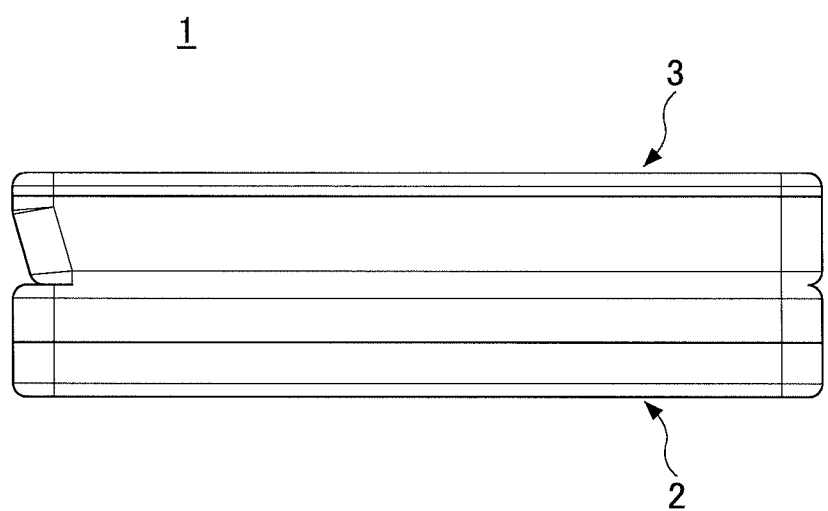
FIG. 8A is a side view of an electronic device for describing a movement of an opening/closing apparatus according to an embodiment of the present invention (part 1)
Figure 8B:
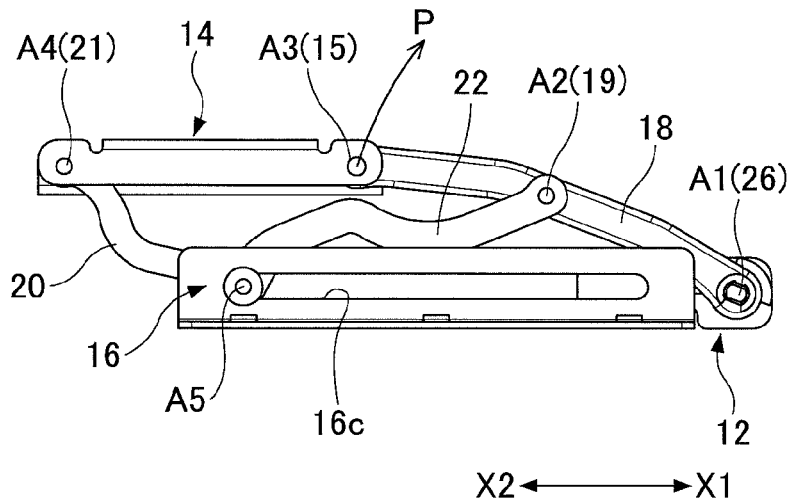
FIG. 8B is a side view of an opening/closing mechanism for describing a movement of an opening/closing apparatus according to an embodiment of the present invention (part 1)

FIG. 8 illustrates the electronic device 1 and the opening/closing mechanism 10 in a closed state. In the closed state, the electronic device 1 has the second housing 2 overlapped on top of the first housing 1 as illustrated in FIG. 8A. Further, in the closed state, the hinge arm 18 of the opening/closing mechanism 10 is in a state centrally rotated about the first shaft part A1 in a counter-clockwise direction as illustrated in FIG. 8B. Along with the rotation, the fifth shaft part A5 is in a state positioned at an end part of the slide groove 16c toward the direction of arrow X2.

In the closed state, the slide arm 20 and the link arm 22 are positioned below the moving plate 14 and the hinge arm 18, to thereby establish a compact state. Further, in the closed state, the hinge unit 30 urges the hinge arm 18 to centrally rotate about the first shaft part A1 in a counter-clockwise direction in the drawing. Further, as described above with reference to FIG. 7C, the stopper plate 37 (first contact surface 37a) connected to the base shaft 26 is pressed against the stopper pin 13. Therefore, the first housing 2 (fixed plate 12) and the second housing 3 (moving plate 14) can be prevented from becoming unstable in the closed state.

Figure 9A:
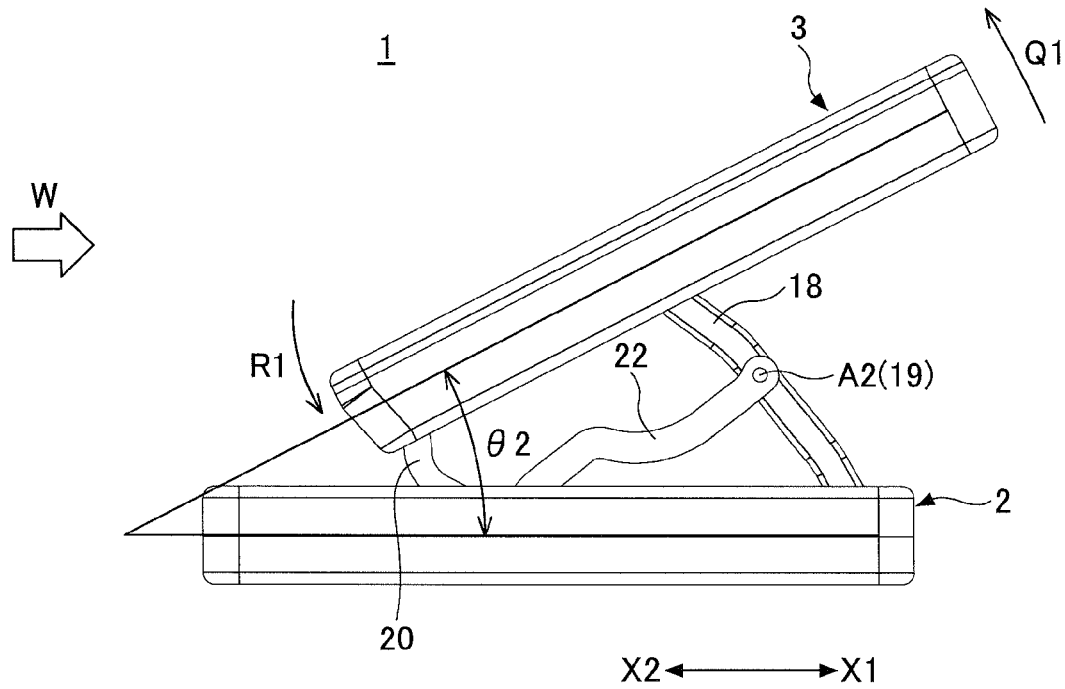
FIG. 9A is a side view of an electronic device for describing a movement of an opening/closing apparatus according to an embodiment of the present invention (part 2)
Figure 9B:
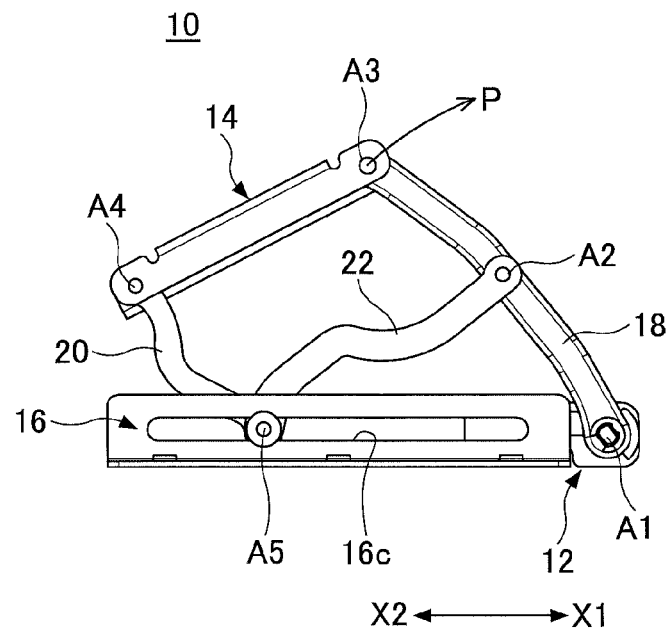
FIG. 9B is a side view of an opening/closing mechanism for describing a movement of an opening/closing apparatus according to an embodiment of the present invention (part 2)

When the second housing 3 is operated to move from this closed state to the open position against the urging force of the hinge unit 30, the second housing 3 separates from the first housing 2 and moves toward the open position as illustrated in FIG. 9A. Along with this movement, the hinge arm 18 begins to centrally rotate about the first shaft part A1 in a direction indicated by arrow P of FIG. 9B. Thereby, the slide arm 20 and the link arm 22 also begin to centrally rotate about each of the shaft parts A2, A3, A4, and A5. Thereby, the moving plate 14 begins to move from the closed position.

Further, the lower end part of the link arm 22 is connected to the fifth shaft part A5 that is movably engaged to the slide groove 16c. Accordingly, the link arm 22 moves the fifth shaft part A5 along the slide groove 16c in direction X1 by rotating the hinge arm 18 in direction P. Because the fifth shaft part A5 moves along the slide groove 16c in this manner, each of the arms 18, 20, 22 can be smoothly rotated.

During this movement, the moving plate 14 is supported by two arms, one being the hinge arm 18 and the other being the slide arm 20. Therefore, the moving plate 14 can maintain a steady position during the movement. Compared to being supported by only a single arm, the position of the moving plate 14 during the movement can be prevented from becoming unstable.

As described above, the length of the slide arm 20 is set to be shorter than the length of the hinge arm 18. Therefore, when the moving plate 14 moves from the closed position to the open position, the side of the second housing 3 toward the X1 direction is displaced in a direction indicated by arrow Q1 of FIG. 9A, and the side of the second housing 3 toward the X2 direction is displaced in a direction indicated by arrow R1 of FIG. 9A. That is, the second housing 3 (moving plate 14) moves in a tilted position (inclined position) relative to the first housing 2 (fixed plate 12).

In a case of performing an opening or a closing operation on the electronic device 1 (opening/closing mechanism 10), the position of the operator would typically be the left side of the electronic device 1 (opening/closing mechanism 10) in FIG. 9. Therefore, the line of sight of the operator would be directed in a direction indicated by arrow W in FIG. 9A. The opening/closing mechanism 10 according to this embodiment is set to move the second housing 3 (moving plate 14) in a tilted position relative to the first housing 2 (fixed plate 12) and have the X2 side positioned lower than the X1 side in FIG. 9A.

With the above-described configuration, each of the arms 18, 20, 22 becomes hidden by the second housing 3 (moving plate 14) when moving the second housing 3 (moving plate 14). Therefore, the aesthetic during the movement of the second housing 3 (moving plate 14) can be improved.

Figure 10A:
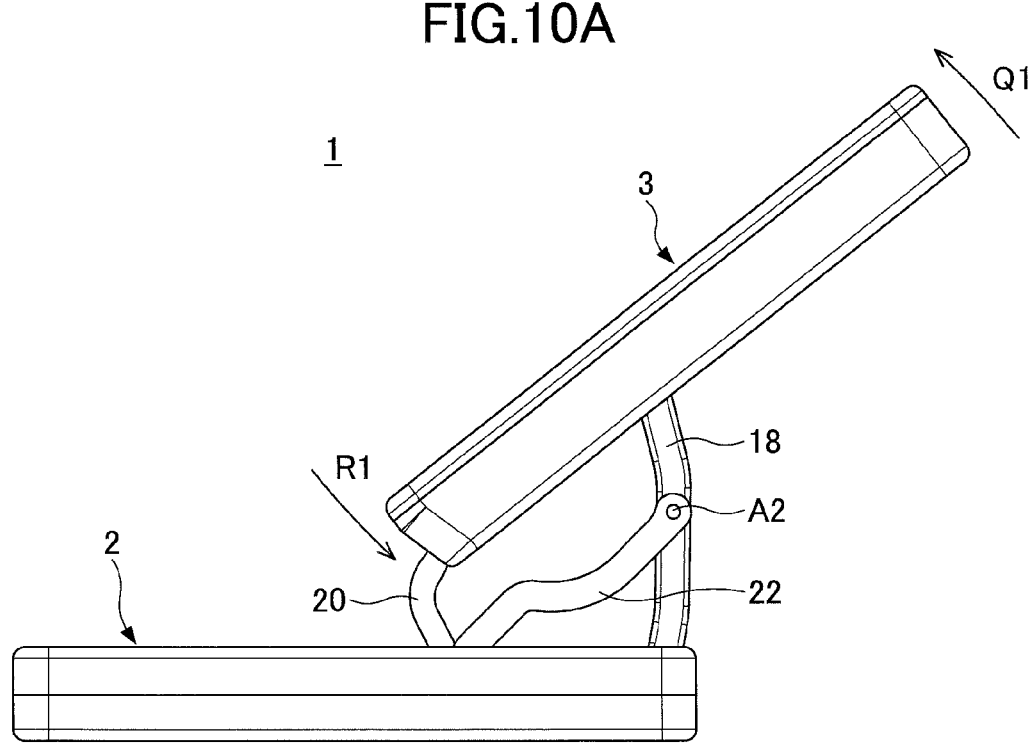
FIG. 10A is a side view of an electronic device for describing a movement of an opening/closing apparatus according to an embodiment of the present invention (part 3)
Figure 10B:
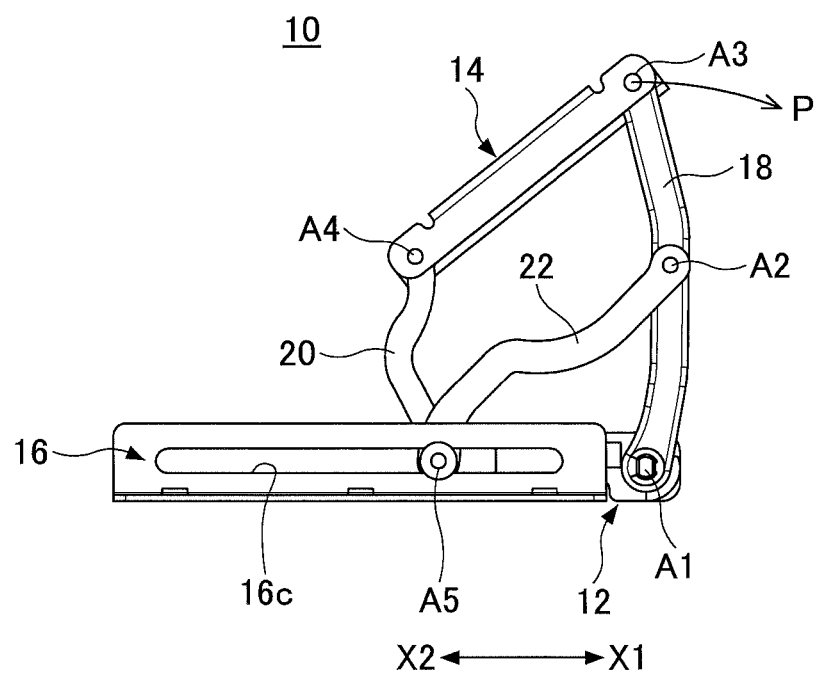
FIG. 10B is a side view of an opening/closing mechanism for describing a movement of an opening/closing apparatus according to an embodiment of the present invention (part 3)

FIG. 10 illustrates a state where the second housing 3 (moving plate 14) has moved to a neutral position. In this embodiment, the hinge arm 18 is set so that the neutral position is a position in which the hinge arm 18 is rotated 90 degrees from the closed state.

When in the neutral position, the peak parts of the convex surfaces of the head cam 31 and the slide cam 32 of the hinge unit 30 are in a state contacting each other as described above. In the neutral position, the rotating urging force of the hinge arm 18 exerted by the hinge unit 30 is momentarily eliminated. Then, by operating the second housing 3 (moving plate 14) to further move from the neutral position to the open position, running torque generated at the contacting surface between the head cam 31 and the slide cam 32 is inverted, to thereby urge rotation of the base shaft 26, so that the moving plate 14 moves toward the open position.

Figure 12A:
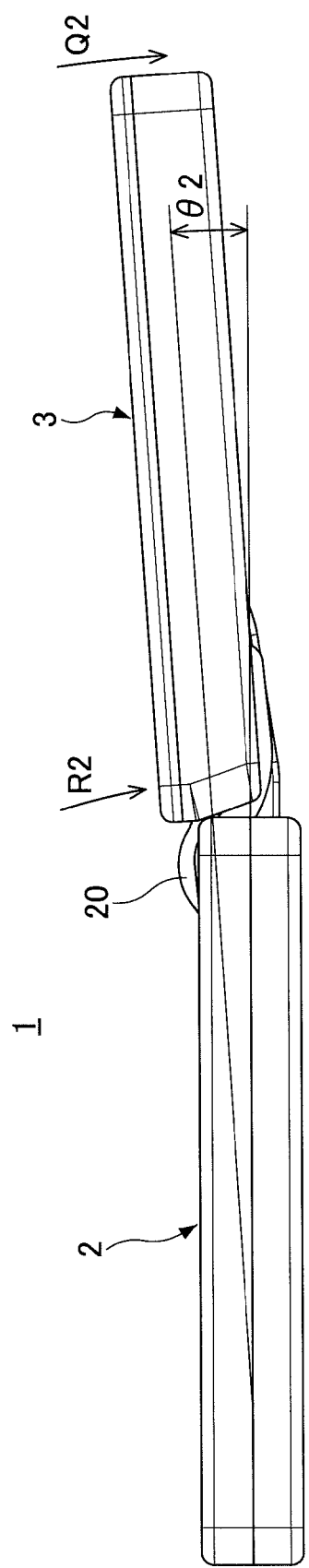
FIG. 12A is a side view of an electronic device for describing a movement of an opening/closing apparatus according to an embodiment of the present invention (part 5)
Figure 12B:
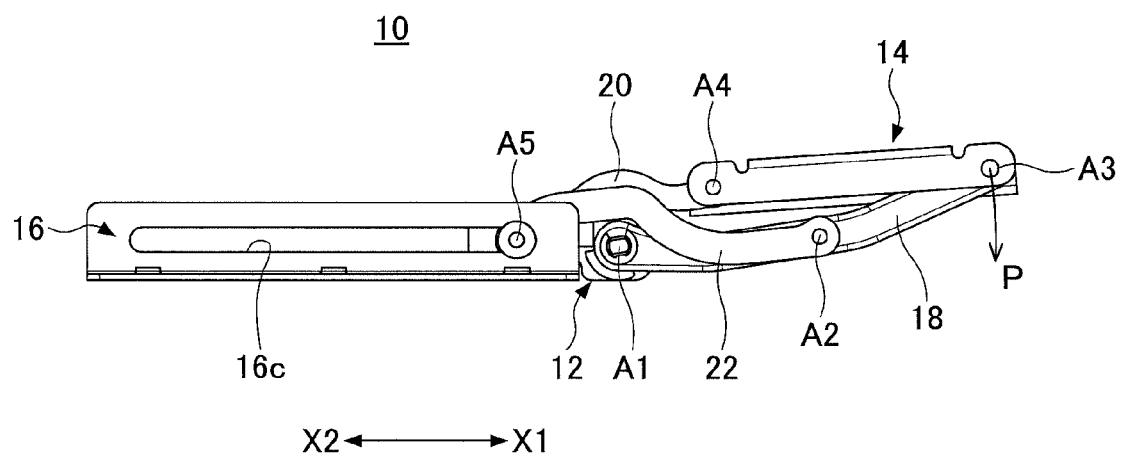
FIG. 12B is a side view of an opening/closing mechanism for describing a movement of an opening/closing apparatus according to an embodiment of the present invention (part 5)
Figure 13A:
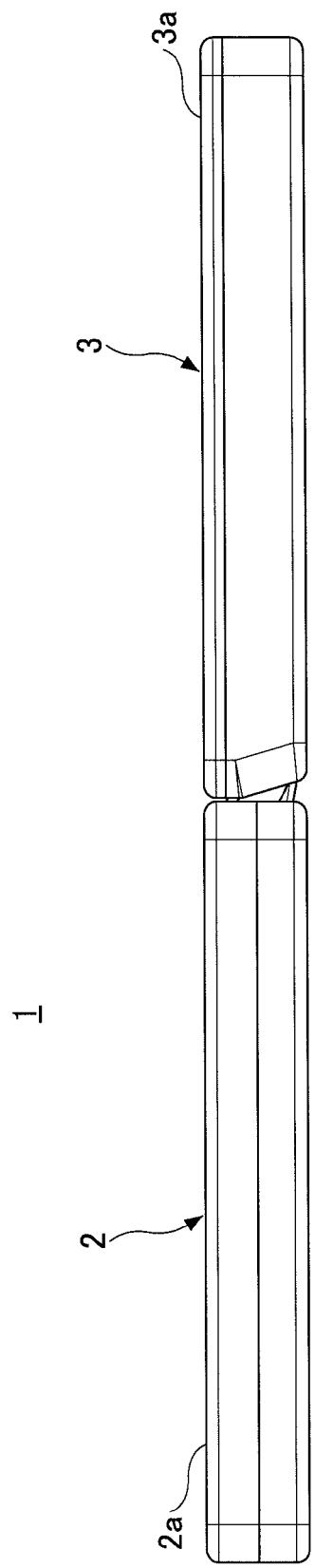
FIG. 13A is a side view of an electronic device for describing a movement of an opening/closing apparatus according to an embodiment of the present invention (part 6)
Figure 13B:
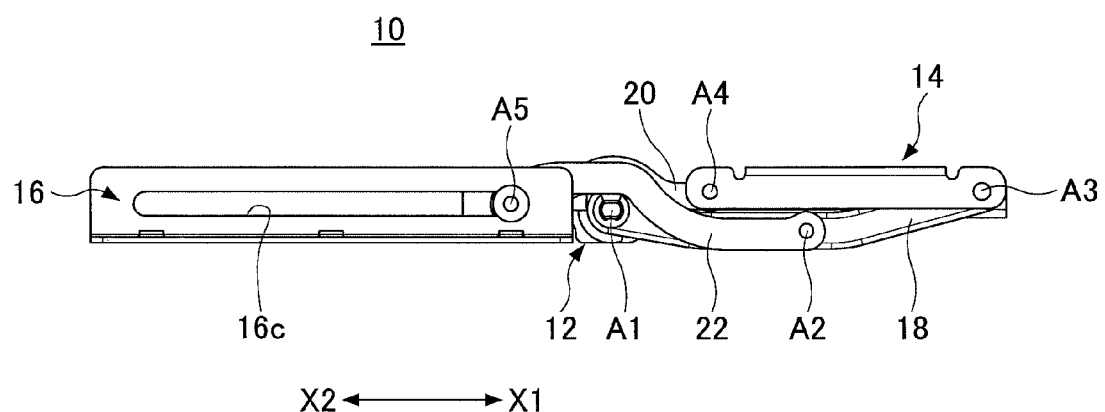
FIG. 13B is a side view of an opening/closing mechanism for describing a movement of an opening/closing apparatus according to an embodiment of the present invention (part 6).

After being moved further beyond the neutral position, the hinge arm 18 is urged to centrally rotate about the first shaft part A1 in a clockwise direction (opening direction). Therefore, after the second housing 3 (moving plate 14) is slightly operated to move from the neutral position toward the open position, the second housing 3 (moving plate 14) sequentially automatically moves toward the open position as illustrated in FIGS. 11 to 13.

Figure 11A:
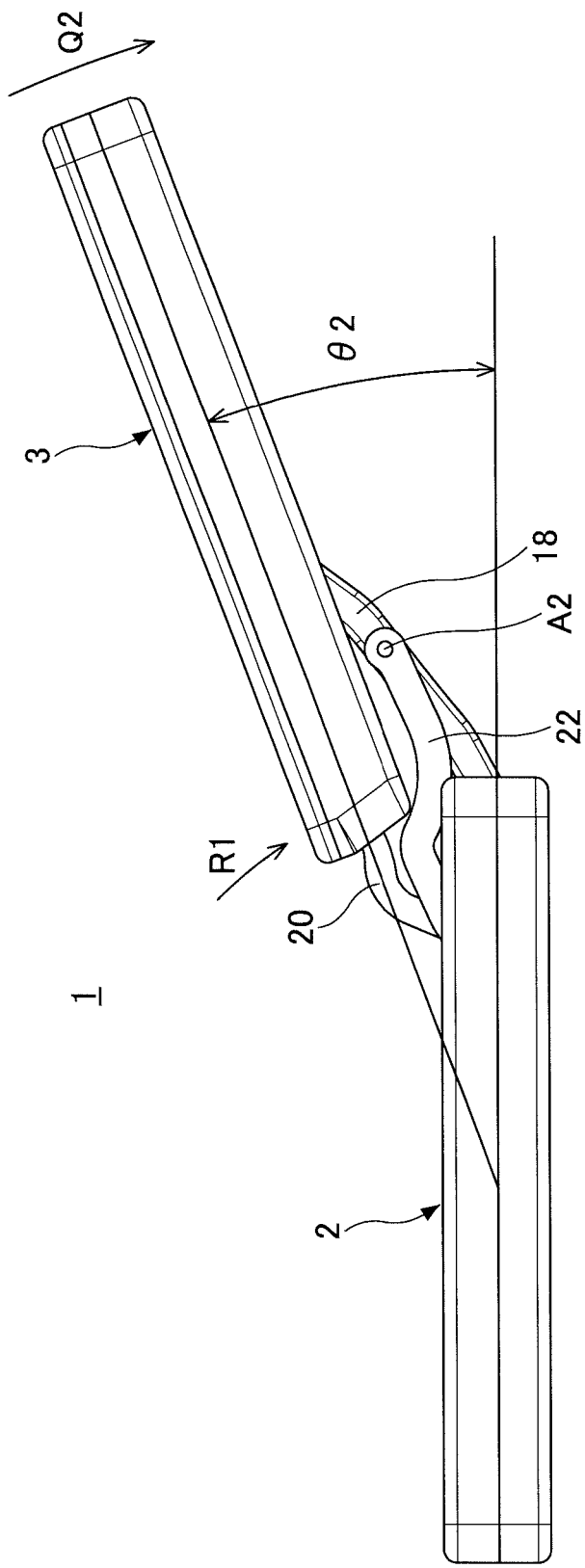
FIG. 11A is a side view of an electronic device for describing a movement of an opening/closing apparatus according to an embodiment of the present invention (part 4)
Figure 11B:
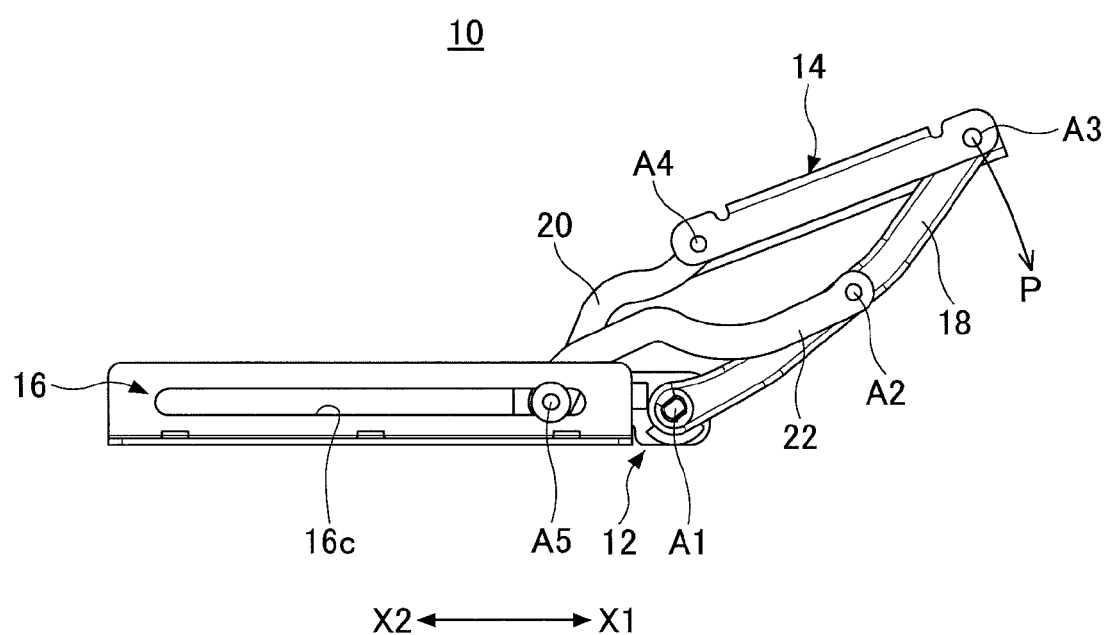
FIG. 11B is a side view of an opening/closing mechanism for describing a movement of an opening/closing apparatus according to an embodiment of the present invention (part 4)

FIG. 11 illustrates a state where the hinge arm 18 is rotated approximately 135 degrees from the closed position. The shaft pin 19 pushes the third shaft part A3 upward until the hinge arm 18 reaches the neutral position (a position being rotated 90 degrees from the closed state) from the closed position. Thereby, the second housing 3 (moving plate 14) can be tilted.

If the hinge arm 18 is moved beyond the neutral position, the hinge arm 18 is configured to force the third shaft part A3 downward. Accordingly, as illustrated in FIGS. 11 and 12, the tilt angle θ2 of the second housing 3 (moving plate 14) gradually becomes smaller as the hinge arm 18 is rotated toward the P direction. That is, the second housing 3 (moving plate 14)

becomes closer to a horizontally lain position as the second housing 3 (moving plate 14) is moved from the neutral position to the closed position.

At the point where the second housing 3 (moving plate 14) has reached the open position as illustrated in FIG. 13, the upper surface of the first housing 2 and the upper surface of the second housing 3 become positioned on the same plane.

It is to be noted that the fixed plate 12 and the moving plate 14 may not always be positioned on the same plane when the upper surface of the first housing 2 and the upper surface of the second housing 3 become positioned on the same plane depending on, for example, the manner in which the fixed plate 12 is attached with respect to the first housing 2 or the manner in which the moving plate 14 is attached with respect to the second housing 3. However, in this specification, when the upper surface of the first housing 2 and the upper surface of the second housing 3 are positioned on the same surface, the positional relationship between the fixed plate 12 and the moving plate 14 is assumed to be that "the moving plate 14 and the fixed plate 12 are positioned substantially on the same plane".

In the open state, each of the arms 18, 20, 22 is positioned below the moving plate 14, and is overlapped in the axial direction of the base shaft 26. Therefore, the opening/closing mechanism 10 attains a compact size even in the closed state.

Further, the hinge unit 30 urges the hinge arm 19 to centrally rotate about the first shaft part A1 in the clockwise direction in the drawing even in the open state. The urging force of the hinge unit 30 may be considered to press the third shaft part A3 downward and cause the first housing 2 and the second housing 3 to form an inverted V-shape.

However, in this embodiment, the step part of the second contact surface 37b of the stopper plate 37 connected to the base shaft 26 is configured to engage the corner part of the stopper pin 13 as described above with reference to FIG. 7D. Therefore, by this engagement, the rotation of the base shaft 26 is constrained, and the second housing 3 (moving plate 14) is prevented from moving beyond the open position. In this state, the stopper plate 37 is pressed against the stopper pin 13 by the urging force of the hinge unit 30. Therefore, the first housing 2 (fixed plate 12) and the second housing 3 (moving plate 14) can be prevented from being unstable in the open state.

Because the operation and movement for moving the second housing 3 (moving plate 14) from the open state of FIG. 13 to the closed state is the opposite to those described above with reference to FIGS. 8 to 13, the description of the operation and movement for moving the second housing 3 (moving plate 14) from the open state of FIG. 13 to the closed state is omitted.

Hence, with the opening/closing apparatus 10 according to the above-described embodiment of the present invention, there can be maintained a state where the moving plate 14 and the fixed plate 12 are positioned substantially on the same plane in the open position by using a simple mechanism. Because the link arm 22 is connected to the hinge arm 18 at the second shaft part A2 and at the fifth shaft part A5, the fifth shaft part A5 connected to the slide arm 20 moves along the slide groove 16c in correspondence with the rotation of the hinge arm 18. Accordingly, the second housing (moving plate 14) can be moved between the open position and closed position by a single motion.

With the above-described embodiment of the present invention, by having a fifth shaft part move inside a slide groove along with rotation of a hinge arm, an end part of a slide arm can be moved in correspondence with the rotation of the hinge arm. Therefore, a moving plate can be smoothly moved between a closed position and an open position with a single motion.

Further, the present invention is not limited to these embodiments, but various variations and modifications may be made without departing from the scope of the present invention.

The present international application is based on Japanese Patent Application No. 2010-113010 filed on May 17, 2010, the entire contents of which are incorporated herein by reference.

The invention claimed is:

1. An opening/closing device comprising:
a fixed plate;
a moving plate movable relative to the fixed plate;
a slide plate that is formed having a slide groove;
a hinge arm including a first shaft part rotatably connected to the fixed plate, a third shaft part rotatably connected to the moving plate, and a second shaft part provided between the first shaft part and the third shaft part, and configured to move the moving plate between a closed position and an open position relative to the fixed plate by centrally rotating about the first shaft part;
a slide arm including a fourth shaft part rotatably connected to the moving plate and a fifth shaft part connected slidably along the slide groove of the slide plate, and configured to move the moving plate between the closed position and the open position relative to the fixed plate by rotating about the fourth shaft part;
a link arm having one end part connected to the second shaft part and another end part connected to the fifth shaft part;
wherein the fifth shaft part is configured to slide inside the slide groove as the link arm moves along with the moving of the hinge arm when the moving plate is moved between the closed position and the open position.

2. The opening/closing device as claimed in claim 1, wherein the first shaft part has a semiautomatic hinge connected thereto.

3. The opening/closing device as claimed in claim 1, wherein a length of the hinge arm is set to be longer than a length of the slide arm.

4. The opening/closing device as claimed in claim 1, wherein the moving plate and the fixed plate are positioned substantially on the same plane when the moving plate is moved to the open position.

\* \* \* \* \*